2,870,100

PRODUCTION OF POLYMERS OF EPOXIDE COMPOUNDS

David G. Stewart, Flixton, Manchester, Dhafir Y. Waddan, Manchester, and Edward T. Borrows, Bowdon, England, assignors to Shell Development Company, New York, N. Y., a corporation of Delaware No Drawing. Application February 2, 1956
Serial No. 563,156

Claims priority, application Great Britain
February 4, 1955

14 Claims. (Cl. 260—2)

This invention relates to a process for the production of polymers of an epoxide compound. More particularly, the invention pertains to a process for the production of polymers of an epoxidized mono-olefinic hydrocarbon, especially high molecular weight polymers of an alkylene oxide.

The conventional processes and catalysts heretofore used in the production of alkylene oxide polymers do not yield products of high molecular weights, i. e., polymers having molecular weights above 20,000. It has, however, been stated (Staudinger and Lohmann, Liebig's Annalen der Chemie, 505, 41, 1933) that if ethylene oxide is left in contact with a catalyst consisting of zinc oxide, strontium oxide or calcium oxide for very long periods ranging from 3 months to 2 years, high polymers having molecular weights of from 60,000 to 120,000 are obtained. It is further disclosed in German Patent No. 821,349 that when alkylene oxides such as ethylene oxide or 1,2-propylene oxide are contacted with activated alumina at 25 to 50° C. under pressure, high molecular weight polymers are produced, the degree of polymerization being up to 2000 and higher.

It is an object of the present invention to provide an improved process for the production of polymers of an epoxide compound. Another object is to provide a process for production of epoxide polymers having molecular weights above 20,000. A further object is to provide a process for prdoucing alkylene oxide polymers employing a more active catalyst.

These and other objects which will become apparent are accomplished by the present invention which is an improved process for the production of polymers of an epoxide compound. According to the process, an epoxidized mono-olefinic hydrocarbon is contacted with a catalyst of the formula $MeRR^1_x$ wherein Me is a polyvalent metal selected from groups II and III of the periodic table, R is a hydrocarbon radical, each $R^1$ is a member of the class consisting of a hydrogen atom, a halogen atom, a hydrocarbon radical, an alkoxy radical and a secondary amino radical, and $x$ is the valency of the metal Me minus one. The metal in the catalyst is any of the group II or III metals such as Be, Mg, Ca, Sr, Ba, Ra, Zn, Cd, Hg, Al, Ga, In, Tl, Sc, Y, La and Ac. The hydrocarbon radicals are of any type including aliphatic, aromatic and alicyclic radicals as exemplified by methyl, ethyl, propyl, isopropyl, isobutyl, tert-butyl, allyl, oleyl, propargyl, phenyl, cresyl, xylyl, ethylphenyl, benzyl, cinnamyl, naphthyl, cyclopentyl, cyclohexyl, cyclohexenyl and related groups. The halogen atom or atoms contained in the organo-metallic catalyst are fluorine, chlorine, bromine and/or iodine. Representative alkoxy radicals in the catalyst include methoxy, ethoxy, isopropoxy, tert-butoxy, octoxy and like groups.

The hydrocarbon radical or radicals in the catalyst used in the process of the invention are preferably straight or branched chain alkyl radicals containing up to 10 carbon atoms. The secondary amino radical or radicals, when present, is or are attached to the metal (Me) through the nitrogen atom which may form part of a ring as for example the piperidyl radical. The preferred catalysts are organic compounds of aluminum, zinc and magnesium of the above formula. Particularly good results have been obtained with triethyl aluminum, triisobutyl aluminum, trioctyl aluminum, diisobutyl aluminum hydride, diethyl aluminum ethoxide, diethyl aluminum chloride, ethyl aluminum dibutoxide and diethyl magnesium. The organo-metallic catalysts are known compounds.

The process of the invention is applicable to polymerizing any epoxidized mono-olefinic hydrocarbon—i. e., a hydrocarbon containing an oxirane group. Although the process is especially suited to produce high molecular weight polymers of alkylene oxides, particularly those of 2 to 4 carbon atoms such as ethylene oxide, 1,2-propylene oxide and isobutylene oxide, the process can be used to obtain polymers of any other of the epoxide compounds such as 1,2-butylene oxide, 2,3-butylene oxide, butadiene monoxide, 1,2-pentylene oxide, 2,3-hexylene oxide, 3,4-hexylene oxide, 3-ethyl-2,3-pentylene oxide, 1,2-dodecylene oxide, cyclopentene oxide, cyclohexene oxide, camphene oxide, styrene oxide, benzylethylene oxide, and the like. In being polymers of mono-epoxide compounds, the products of the process are thermoplastic substances.

The process of the invention is executed by bringing the epoxy compound in liquid state into contact with the catalyst. The polymerization reaction may be carried out in the presence of an inert solvert—e. g. an aromatic hydrocarbon (benzene, toluene, xylene, etc.), aliphatic hydrocarbon (isopentane, n-hexane, octane, etc.), chlorinated hydrocarbon (carbon tetrachloride, ethylene dichloride, propylene dichloride, etc.) and the like, or the reaction may be effected without solvent. Use of solvent is a convenient means of handling the catalyst. Various amounts of solvent are suitable such as from about 10% to 100% or more of the epoxide treated. The amount of catalyst may also be varied over wide limits although ordinarily about 0.1 to 2% by weight is used.

The temperature at which the reaction is carried out may be from about 0 to 200° C. or higher. Usually temperatures of about 90 to 160° C. are employed. The pressure under which the reaction is conducted is from about atmospheric to 40 or more atmospheres. Since the polymerization reaction occurs in liquid phase, sufficient pressure is employed to keep the epoxide compound in liquid condition regardless of whether an inert solvent is present in the reaction mixture or not. The choice of catalyst, temperature and pressure is an effective means of controlling the intrinsic viscosity (molecular weight) of the resulting polymer.

The process of the invention is executed in a closed reaction vessel in either batch or continuous fashion. The epoxide compound is generally added to the catalyst or to a solution of the catalyst in a solvent, but the addition may be in the reverse order if desired. The mixture of epoxide compound in contact with the catalyst is then allowed to stand or is heated to the desired temperature for a time sufficient to obtain a substantial amount of the polymer. Batch operation is usually conducted by bringing the epoxide compound and catalyst together in a closed reaction vessel wherein the desired polymerization occurs with or without stirring of the reaction mixture. It is convenient to effect the polymerization in continuous fashion with use of a residence reactor. In such operation, a mixture of the epoxide compond, catalyst and solvent, if used, is charged to a vessel fitted with an external pump connected by pipes to more or less opposite points of a reaction vessel whereby agitation and circulation is provided. After the desired extent of polymerization has occurred, fresh charge material is fed continuously or intermittently to the vessel and substantially corresponding amounts of reaction mixture are withdrawn. A steady state is reached and the desired polymer is produced in continuous fashion. If desired, the external circuit may be fitted with a heat exchanger to take care of the thermal requirements of the system.

The excess or unreacted epoxide compound remaining in the reaction mixture upon completeion of the desired extent of polymerization is separated or recovered by distillation. The resulting product is purified by washing with a non-solvent for the polymer, or by dissolving it in a solvent and slowly precipitating it by addition of a non-solvent miscible with the solvent. Concentration of the filtrate from this latter operation usually yields low molecular weight oils, the amount of which depends on the catalyst used. Waste is usually a suitable solvent for low and high polymers of ethylene oxide while polymers of higher epoxide require use of more active solvents such as acetone.

The polymer is freed of catalyst by bringing it or a solution thereof into contact with water, filtering off the resulting metal oxide or hydroxide and evaporating the solution, or if insoluble in water, by extraction with dilute mineral acid such as hydrochloric or sulfuric acid.

The products of the process are valuable polyethers. The liquid polymers may be used as solvents, chemical raw materials and plasticizing agents for resins. The solid polymers may be molded into useful articles or employed as film-forming ingredients in protective coating compositions. The polymers are also useful as lubricants, binders, vehicles, and intermediates in the rubber, food, pharmaceutical, cosmetic, agricultural, textile, petroleum and many other industries.

The following examples illustrate the process of the invention which, however, is not to be construed as limited to details described therein.

Example 1

Gaseous ethylene oxide (88.7 parts by weight) was passed into a solution of triethyl aluminum (1 part by weight) in benzene (88 parts by weight). During the addition cooling was applied and when the addition had been completed the mixture was cooled to 0° C. After maintaining the reaction mixture at this temperature for five days, the excess ethylene oxide was distilled off and a clear viscous benzene solution obtained. This was added slowly to petroleum ether (100 parts by weight) with stirring. A colorless fibrous solid (12.5 parts by weight) was precipitated which was filtered off and dried. The relative viscosity ($\eta r$) of this product in 0.1% trichlorethylene solution was 1.210. Concentration of the filtrate gave no other product. The solid product (5 parts by weight) was dissolved in water (500 parts by weight containing concentrated ammonia 1 part by weight) and refluxed for two hours, and a white precipitate of inorganic material was obtained, which was filtered off. The polymer was recovered from solution by distilling off the water and then dissolved in benzene (250 parts by weight) to give a clear viscous solution which was filtered and precipitated as above. In this manner the aluminum content of the solid was reduced from 1.25% to 0.05%. The intrinsic viscosity was 1.007.

Example 2

Liquid ethylene oxide (88.7 parts by weight) was rapidly run into a cooled solution of triethyl aluminum (0.5 part by weight) in benzene (8.8 parts by weight) in an autoclave which was then heated at 160° C. for five hours. The product was diluted with benzene (100 parts by weight), excess ethylene oxide distilled off and the resulting solution precipitated with petroleum ether as before. A colorless solid (47 parts by weight $$\eta r = 1.027)$$

was obtained and concentration of the filtrate yielded an oily residue (16.4 parts by weight).

Example 3

Following the procedure described in Example 2, ethylene oxide (88.7 parts by weight), benzene (8.8 parts by weight) and triisobutyl aluminum (0.5 part by weight) were heated at 100° C. for 65 hours. This gave a colorless polymer (28.0 parts by weight $\eta r = 1.163$) and a small oily residue (1.2 parts by weight).

Example 4

Following the procedure described in Example 2, ethylene oxide (88.7 parts by weight), benzene (8.8 parts by weight) and diisobutyl aluminum hydride (0.5 part by weight) were heated at 100° C. for 16 hours. This gave a colorless polymer (13.2 parts by weight) ($\eta r = 1.0945$) and an oily residue (0.6 part by weight).

Example 5

Following the procedure described in Example 2, ethylene oxide (88.7 parts by weight), benzene (8.8 parts by weight) and trioctyl aluminum (0.5 part by weight) were heated at 150° C. for 40 hours. This gave a colorless polymer (42 parts by weight $\eta r = 1.0993$) and an oily residue (2.2 parts by weight).

Example 6

Following the procedure described in Example 2, ethylene oxide (88.7 parts by weight), benzene (8.8 parts by weight) and diethyl magnesium (0.31 part by weight) were heated at 110° C. for 65 hours. This gave a colorless polymer (40 parts by weight) and an oily residue (1 part by weight).

Example 7

Following the procedure described in Example 2, ethylene oxide (88.7 parts by weight), benzene (8.8 parts by weight) and ethyl aluminum dichloride (0.5 part by weight) were heated at 107° C. for 65 hours. This gave a colorless polymer (30.9 parts by weight: $\eta r = 1.345$) and an oily residue (1.9 parts by weight).

Example 8

Following the procedure described in Example 2, ethylene oxide (88.7 parts by weight), benzene (8.8 parts by weight) and diethyl aluminum ethoxide (0.5 part by weight) were heated at 90° C. for 18 hours. This gave a colorless polymer (8.1 parts by weight: $\eta r = 1.0571$) and an oily residue (3.02 parts by weight).

Example 9

Following the procedure described in Example 2, ethylene oxide (88.7 parts by weight) and ethyl zinc tert-butoxide (0.5 part by weight) were heated at 140° C. for 16 hours. This gave a colorless polymer (79.5 parts by weight: $\eta r = 1.076$) and an oily residue (1 part by weight).

Example 10

1,2-propylene oxide (29 parts by weight) in hexane (30 parts by weight) was added dropwise to a stirred solution of triethyl aluminum (0.5 part by weight) in hexane (50 parts by weight) at 20° C. After stirring at this temperature for 24 hours, the solvent was removed and the water insoluble polymer extracted with hot dilute hydrochloric acid. After drying a colorless waxy polymer (15.2 parts by weight) was obtained, which was soluble in most organic solvents but insoluble in water.

Example 11

A solution of diethyl aluminum chloride (0.5 part by weight) in benzene (20 parts by weight) was added dropwise to a stirred solution of 1,2-propylene oxide (30 parts by weight) in benzene (30 parts by weight). After refluxing the mixture for 24 hours, the product was treated as in Example 10 to give a colorless polymer (10.7 parts by weight).

Example 12

1,2-propylene oxide (80 parts by weight), benzene (8.8 parts by weight) and triethyl aluminum (0.5 part by weight) were heated in an autoclave at 100° C. for 8 hours. After treating the product as described in Example 10 a hard colorless polymer (20 parts by weight) was obtained.

Example 13

1,2-propylene oxide (80 parts by weight), benzene (8.8 parts by weight) and diethyl zinc (0.6 part by weight) were heated at 130° C. for 15 hours. After treating the product as described in Example 10, a colorless polymer (31.2 parts by weight $\eta r = 1.0605$) was obtained.

The polymers produced in the above examples had molecular weights of above 20,000 as determined by the intrinsic viscosities of solutions thereof. A sample of known molecular weight of 20,000 having an intrinsic viscosity in solution of 0.5 was used as a basis for comparison.

Example 14

Following the procedure described in Example 2, ethylene oxide (88.7 parts), benzene (8.8 parts) and diethyl piperidyl aluminium (0.5 part) were heated at 100° C. for 65 hours. A colourless polymer (4.1 parts), of $\eta r = 1.124$, and an oily residue (0.4 part) were obtained.

Example 15

Liquid ethylene oxide (121.8 parts) was added to a solution of triethyl aluminum (1.7 parts) in benzene (14.1 parts) at 0° C. in an autoclave, which was then sealed and the contents allowed to come to room temperature slowly. After half an hour the internal temperature increased to 35° C. and a pressure of 40 pounds per square inch (gauge) was recorded on the gauge. After allowing the reaction mixture to stand for 18 hours at room temperature, the unreacted ethylene oxide was distilled off and the reaction product washed with petroleum ether (B. P. 40–60° C.). The non-cyclic polymer which was precipitated was filtered off and dried. Yield of polymer = 19.4 parts. The filtrate from the polymer was distilled using a fractionating column and after the petroleum ether and benzene had been removed, dioxan (18.0 parts) of B. P. 100.5–101.5° C.: crystallising point = 11.4° C.: and refractive index $n_D^{25} = 1.4196$ and the cyclic tetramer of ethylene oxide (B. P. 118–119° C.: 13.0 parts) were obtained, leaving a viscous, low-melting oil (7.3 parts) as bottoms.

Example 16

Liquid ethylene oxide (869.7 parts) was added in portions (each of 173.9 parts) at hourly intervals to a stirred solution of triethyl aluminium (39.17 parts) in anhydrous ether (719 parts), the temperature during the addition being kept below 16° C. by cooling with ice water. When the addition was complete, the mixture was slowly warmed to room temperature and stirred for a further 72 hours. After distilling off the unreacted ethylene oxide, petroleum ether (B. P. 40° C.) was added to the residue and the non-cyclic polymer which was precipitated was filtered off and dried. Yield of polymer = 13.1 parts. The solvents were removed from the filtrate by distillation and fractionation of the residue gave dioxan (215.5 parts: B. P. 100.5–102° C.), the cyclic tetramer of ethylene oxide (65.76 parts: B. P. 118–120° C. at 15 mm.) and an oily residue (89.83 parts).

Example 17

A solution of ethylene oxide (30 parts) in diethyl ether (71.9 parts) was added dropwise with stirring to a solution of triethyl aluminium (22.8 parts) in diethyl ether (179.75 parts). The temperature was maintained at 2° C. by cooling with ice water. When the addition was complete, the mixture was stirred at 2° C. for 4 hours and then allowed to come to room temperature. After stirring for a further 24 hours, distilled water (300 parts) was added carefully and then sufficient concentrated hydrochloric acid to dissolve the precipitated inorganic material: the aqueous layer was separated from the organic layer and extracted continuously for 48 hours with diethyl ether. The combined ethereal solutions were dried with magnesium sulphate, filtered and distilled using a fractionating column. In this way dioxan (8.2 parts) and the cyclic tetramer of ethylene oxide (4.2 parts) were obtained.

Example 18

Liquid ethylene oxide (870 parts) was added rapidly to a solution of tri-iso-butyl aluminium (5 parts) in benzene (88 parts) in an autoclave which was then heated at 100° C. for 5 hours. The product was diluted with benzene (1000 parts), unreacted oxide distilled off, and the resulting solution added slowly to petroleum ether (1500 parts). The polymer which was precipitated (65 parts of relative viscosity $\eta r = 1.055$ in 0.1% trichlorethylene solution) was filtered off and dried. After removing the solvents and dioxan, the residue (34 parts) was distilled using a fractionating column and the cyclic tetramer of ethylene oxide (20 parts) obtained, leaving an oily residue (13.5 parts) as bottoms.

We claim as our invention:

1. A process for the production of a polymer of an epoxide compound which comprises polymerizing a vic epoxy-substituted hydrocarbon free from other than aromatic unsaturation at about 0 to 200° C. in the presence of about 0.1 to 2%, by weight, of a catalyst of the formula MeRR$^1_x$ wherein Me is a metal selected from groups II and III of the periodic table, R is a hydrocarbon radical having from 1 to 10 carbon atoms, each R$^1$ is a member of the class consisting of a hydrogen atom, a halogen atom, a hydrocarbon radical of 1 to 10 carbon atoms, an alkoxy radical and a secondary amino radical and $x$ is the valency of the metal Me minus one.

2. A process according to claim 1 wherein the epoxy-substituted hydrocarbon is an alkylene oxide of from 2 to 4 carbon atoms.

3. A process according to claim 1 wherein the epoxy-substituted hydrocarbon is ethylene oxide.

4. A process according to claim 1 wherein the epoxy-substituted hydrocarbon is 1,2-propylene oxide.

5. A process according to claim 4 wherein the catalyst is triethyl aluminum.

6. A process for the production of a polymer of an alkylene oxide which comprises polymerizing an alkylene oxide having the oxygen atom contained in an oxirane group at about 0 to 200° C. in the presence of about 0.1 to 2% by weight of a catalyst of the formula MeRR$^1_x$ wherein Me is a metal selected from groups II and III of the periodic table, R is a hydrocarbon radical, each R$^1$ is a member of the class consisting of a hydrogen atom, a halogen atom, a hydrocarbon radical, an alkoxy radical and a secondary amino radical, and $x$ is the valency of the metal Me minus one.

7. A process for the production of a polymer of ethylene oxide which comprises polymerizing ethylene oxide at about 90 to 160° C. in the presence of about 0.1 to 2% by weight of triethyl aluminum.

8. A process for the production of a polymer of ethylene oxide which comprises polymerizing ethylene oxide dissolved in an inert solvent in the presence of about 0.1 to 2% by weight of triethyl aluminum at about 0 to 200° C.

9. A process according to claim 6 wherein the catalyst is diisobutyl aluminum hydride.

10. A process according to claim 9 wherein the alkylene oxide is ethylene oxide.

11. A process according to claim 6 wherein the catalyst is diethyl aluminum ethoxide.

12. A process according to claim 11 wherein the alkylene oxide is ethylene oxide.

13. A process according to claim 6 wherein the catalyst is ethyl zinc tert-butoxide.

14. A process according to claim 13 wherein the alkylene oxide is ethylene oxide.

References Cited in the file of this patent

C. A., vol. 39, 1945, pp. 5923–5924.